United States Patent [19]

Fisher et al.

[11] Patent Number: 4,578,795
[45] Date of Patent: Mar. 25, 1986

[54] DROP SHORT CONTROL OF ELECTRODE GAP

[75] Inventors: Robert W. Fisher; James P. Maroone; Donald W. Tipping, all of Albuquerque; Frank J. Zanner, Sandia Park, all of N. Mex.

[73] Assignee: The United States of America as represented by the United States Department of Energy, Washington, D.C.

[21] Appl. No.: 453,977

[22] Filed: Dec. 28, 1982

[51] Int. Cl.$^4$ ............................................. H05B 7/148
[52] U.S. Cl. ....................................... 373/70; 373/105
[58] Field of Search .................... 373/67, 70, 104, 105; 164/457, 495

[56] References Cited

U.S. PATENT DOCUMENTS

| | | | |
|---|---|---|---|
| 3,186,043 | 6/1965 | Murtland, Jr. et al. | 164/457 X |
| 3,187,077 | 6/1965 | Murtland, Jr. et al. | 164/457 X |
| 3,187,078 | 6/1965 | Murtland, Jr. et al. | 164/457 X |
| 4,303,797 | 12/1981 | Roberts | 373/52 X |

Primary Examiner—Roy N. Envall, Jr.
Attorney, Agent, or Firm—George H. Libman; Albert Sopp; Judson R. Hightower

[57] ABSTRACT

During vacuum consumable arc remelting the electrode gap between a consumable electrode and a pool of molten metal is difficult to control. The present invention monitors drop shorts by detecting a decrease in the voltage between the consumable electrode and molten pool. The drop shorts and their associated voltage reductions occur as repetitive pulses which are closely correlated to the electrode gap. Thus, the method and apparatus of the present invention controls electrode gap based upon drop shorts detected from the monitored anode-cathode voltage. The number of drop shorts are accumulated, and each time the number of drop shorts reach a predetermined number, the average period between drop shorts is calculated from this predetermined number and the time in which this number is accumulated. This average drop short period is used in a drop short period electrode gap model which determines the actual electrode gap from the drop short. The actual electrode gap is then compared with a desired electrode gap which is selected to produce optimum operating conditions and the velocity of the consumable error is varied based upon the gap error. The consumable electrode is driven according to any prior art system at this velocity. In the preferred embodiment, a microprocessor system is utilized to perform the necessary calculations and further to monitor the duration of each drop short. If any drop short exceeds a preset duration period, the consumable electrode is rapidly retracted a predetermined distance to prevent bonding of the consumable electrode to the molten remelt.

8 Claims, 7 Drawing Figures

DROP SHORT CONTROL OF ELECTRODE GAP

The U.S. Government has rights in this invention pursuant to Contract No. DE-AC04-76DP-00789 between the U.S. Department of Energy and Sandia Corporation.

FIELD OF INVENTION

This invention relates to a method of controlling the position of a consumable electrode and thus the electrode gap in a vacuum consumable arc remelt system.

BACKGROUND OF THE INVENTION

Vacuum consumable arc remelting is a process used to control the solidification of segregation sensitive alloys. This control is accomplished by manipulation of system thermodynamics in a manner such that the advancing solidification region has an abundant supply of liquid metal while simultaneously minimizing local solidification time. Energy is added to the system by means of a vacuum arc and the distribution of this energy influences melt rate, fluid flow within the molten pool, and volume of the molten pool. Fluid flow is particularly affected by transient behavior of the energy distribution.

Electrode gap is one of the important variables affecting this energy distribution. As electrode gap increases, arc energy which could be used for melting may be radiated directly to the walls of the crucible in which the process is being performed and may be therefore lost to the crucible wall coolant. Electrode gap control is therefore extremely important in a successful vacuum consumable arc remelting process.

A variety of electrode gap control schemes have been attempted for use in this process. These variables include average arc voltage and the phenomena known as "hash". Average arc voltage has generally been found to be unreliable and at large arc gaps, the average arc voltage varies only a small amount in response to relatively large variations in arc gap.

A phenomena known as "hash" has also been utilized to control arc gap. Hash is a transient voltage phenomena which accompanies the transfer of metal from the electrode to the molten pool. Hash is a relatively short ($10^{-3}$ second) duration increase in voltage (up to approximately 200 v) over the mean arc voltage. Applicants have discovered that this formation of "hash" or anode spikes is not particularly well correlated to electrode gap. The relationship between anode spike occurrence and electrode gap appears to be related to some unidentified experimental variable in addition to any relationship to electrode gap. While an anode spike is often associated with a drop short at electrode gaps of 0.01 to 0.035 meter, at electrode gaps greater than 0.035 meter there are slightly more anode spikes than drop shorts. It is hypothesized that the anode spikes are related to vapor starvation, a phenomenon which may occur without drop short formation at long electrode gaps. Depending upon electrode gap, the drop short may or may not be associated with an anode spike ("hash"). Thus, anode spikes or "hash" are not particularly well correlated to electrode gap.

Figure 1:
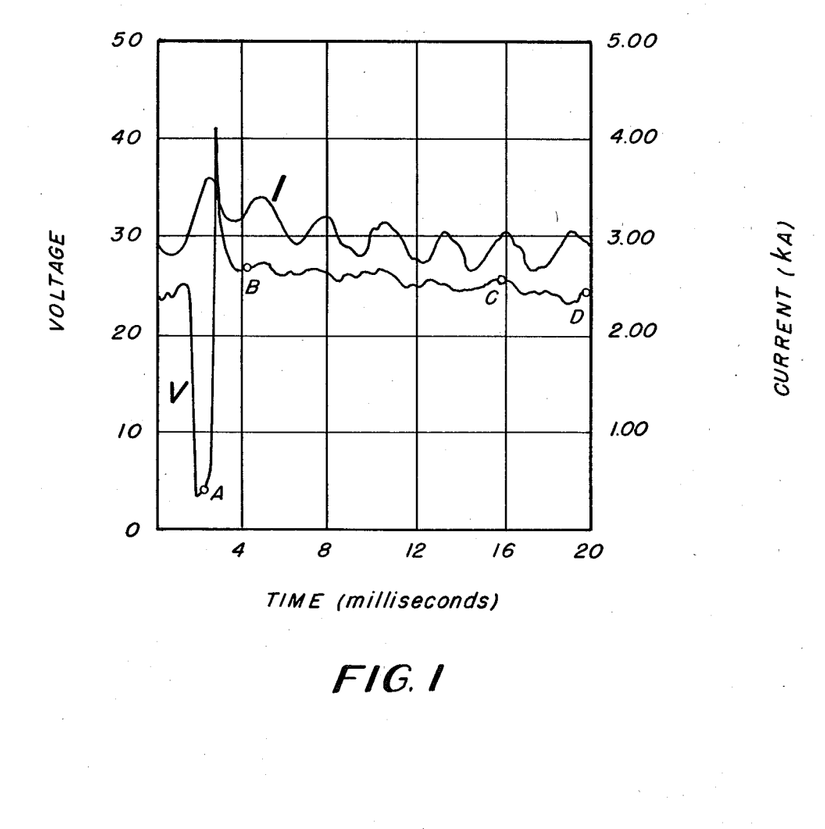
FIG. 1 is the monitored voltage and current of a typical drop short.
Figure 2:
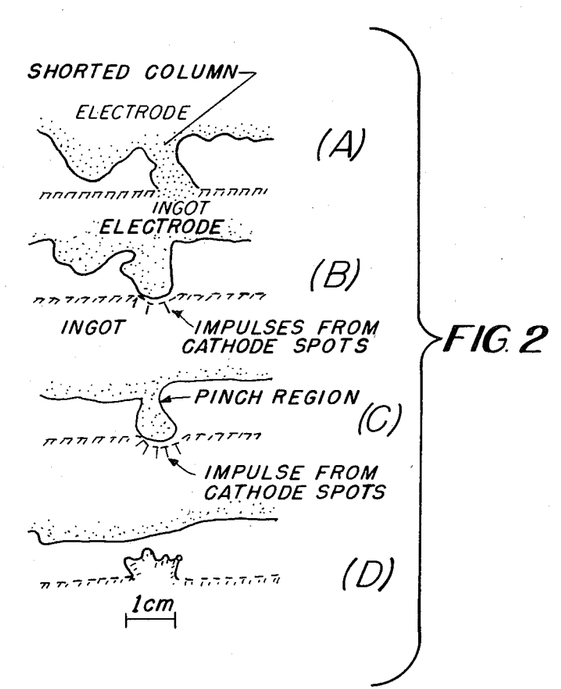
FIG. 2 is a series of schematic side view sketches representative of a typical column pinching sequence of a drop short.

At short electrode gaps, metal is transferred by the formation and subsequent rupture of molten metal columns (drop shorts). These columns form a low resistance bridge between the cathode (electrode) and anode (ingot). The formation of a drop short causes the arc to be momentarily extinguished resulting in a drop in the monitored voltage as measured across the electrodes. The voltage and current waveforms associated with a typical drop short are illustrated in FIG. 1 while the sketch of the occurrence of a typical drop short is illustrated in FIGS. 2 (a–d). FIG. 2(a) illustrates a molten metal column or drop short produced between the electrode and the ingot. The formation of this drop short causes the arc to be momentarily extinguished resulting in a voltage drop as measured between the cathode and anode. The voltage at point A of FIG. 1 corresponds in time to the occurrence of this drop short. Observations indicate that protuberances which develop into drop shorts grow in a cyclic manner with a frequency identical to the ripple of the power supply waveform. Protuberance growth continues until a drop short is formed or the protuberance is attacked by cathode spots. Cathode spots eject metal vapor and ions at velocities of $10^3$ m/s, thereby exerting a force on the molten protuberance and often driving it back into the flat electrode surface. However, when the protuberance grows into a drop short, the arc is momentarily extinguished as shown in FIG. 2a and then reignited at such a time when the drop short can no longer carry the electrical load.

At arc reignition the column is separated (usually at the anode or ingot end) and the material suspended from the electrode is supported by the impulse from accumulated cathode spots. This moment is illustrated in FIG. 2(b) and associated point B on the voltage waveform in FIG. 1. The current associated with the cathode spot accumulation results in a slow magnetic pinch (over tens of milliseconds) of the suspended column until pinch-off occurs. FIG. 2(c) and associated point C on the voltage waveform of FIG. 1 illustrate the column of metal as it is being pinched at the top of the column due to this pinching effect. At pinch-off, a globular mass of the molten metal is transferred to the ingot as shown in FIG. 2(d) and associated point D on the voltage waveform of FIG. 1. Thus, FIGS. 1 and 2 collectively illustrate the drop short phonenema and its associated voltage and current waveforms.

It is important for an understanding of the present invention to define the terms "electrode gap", "arc gap", and "arc length". These terms are not synonomous when applied to the vacuum consumable arc remelt process. Because the electrode surface is not flat during melting, but rather has several protuberances of liquid metal typically extending from it to within quite close proximity of the anode, the mean distance between electrode and ingot (electrode gap) can be much larger than the shortest distance over which an individual arc extends ("arc gap"). Further, arcs are often present at many positions on the electrode, so there are many different values of "arc length" at any given instant. Actual arc gaps of less than 0.001 meter may exist while the electrode gap is decreased to essentially zero. This is due to the support of protuberances by the impulses generated by the cathode spot phenomena. It is speculated that this is possible because cathode spot accumulation intensifies as the protuberance tip approaches the anode, causing localized deformation of the protuberance, and perhaps even of the pool surface, in effect allowing the protuberance to move below the mean surface level of the pool without making contact. When the impulse can no longer sustain the gap, contact is made and a short is observed. "Electrode gap" in this application generally refers to the mean distance between electrode and anode surfaces.

OBJECTS OF THE INVENTION

In view of the aforementioned problems associated with prior electrode gap controls, it is an object of the present invention to provide a new and novel method and apparatus for more accurately controlling electrode gap in a vacuum consumable arc remelt process.

It is another object of the present invention to provide a method and apparatus for accurately controlling electrode gap in a vacuum consumable arc remelt process by monitoring the voltage drop associated with drop shorts.

It is a further object of the present invention to provide an improved electrode gap control system for a vacuum consumable arc remelt process which controls electrode gap based upon the average period between monitored voltage drops associated with drop shorts.

It is a still further object of the present invention to control the electrode gap in a vacuum consumable arc remelt process based upon monitored drop short frequency or period with a predetermined degree of confidence and precision.

These and other objects of the present invention will become more fully apparent with reference to the following specification and drawings which relate to the preferred embodiments of the present invention.

SUMMARY OF THE INVENTION

The present invention monitors the gap voltage between the consumable electrode and the molten surface of the ingot in order to control electrode gap. While average arc voltage is not closely correlated to electrode gap, applicants have discovered that the average period between drop shorts is closely correlated to the electrode gap. Thus, the average period between drop shorts is utilized for control of the electrode gap in the vacuum consumable arc remelting system of the present invention.

The monitored voltage between the consumable electrode and the molten surface of the ingot is compared to a threshold voltage, floating with respect to the arc voltage, to determine the occurrence of drop shorts. As the drop short produces a monitored voltage drop of up to approximately 20 volts, the drop shorts are detected by voltage comparison. A drop short signal is produced and presented to a microprocessor each time a drop short occurs. These drop short signals each have a period corresponding to their frequency and the associated electrode gap. The drop short signals are used to increment a drop short occurrence register which accumulates a count of drop shorts which have occurred. Simultaneously, a system clock accumulates the elapsed time during which this number of drop shorts is accumulated in an elapsed time register. When the drop short occurrence register accumulates a count which indicates that a sufficient number of drop shorts have occurred for a valid statistical drop short frequency determination, the elapsed time period stored in an elapsed time register is divided by the total number of drop shorts stored in said drop short occurrence register to calculate the average period between drop shorts.

A drop short period, electrode gap model is stored within the memory of the microprocessor and is used to calculate the actual electrode gap from the calculated drop short period. In the preferred embodiment, this model is represented as a slope and intercept, the electrode gap being related to drop short period as a linear function.

Once the actual electrode gap is calculated, the actual electrode gap is compared with a desired electrode gap value determined by an operator to produce optimum remelt conditions and a signal is generated indicative of any difference. This signal is digitally decoded and supplied to the consumable electrode drive motor control to control the consumable electrode position.

The system of the present invention further monitors the duration of each drop short signal and if this duration exceeds a predetermined period of time, a short circuit relay is engaged to control the consumable electrode drive to quickly raise the consumable electrode a predetermined distance from the molten surface of the ingot. The system of the present invention further includes a terminal which is interfaced to the microprocessor to enter necessary control parameter information therein.

BRIEF DESCRIPTION OF THE DRAWINGS

The features of the present invention will become more fully apparent by reference to the attached drawings wherein.

PREFERRED EMBODIMENT OF THE PRESENT INVENTION

Figure 3:
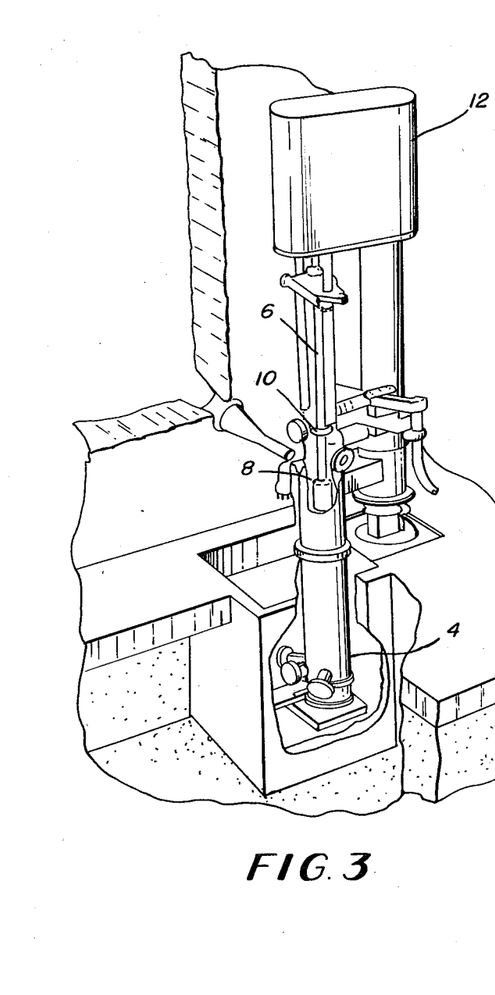
FIG. 3 is a perspective view of the vacuum consumable arc remelting furnace of the present invention.
Figure 4:
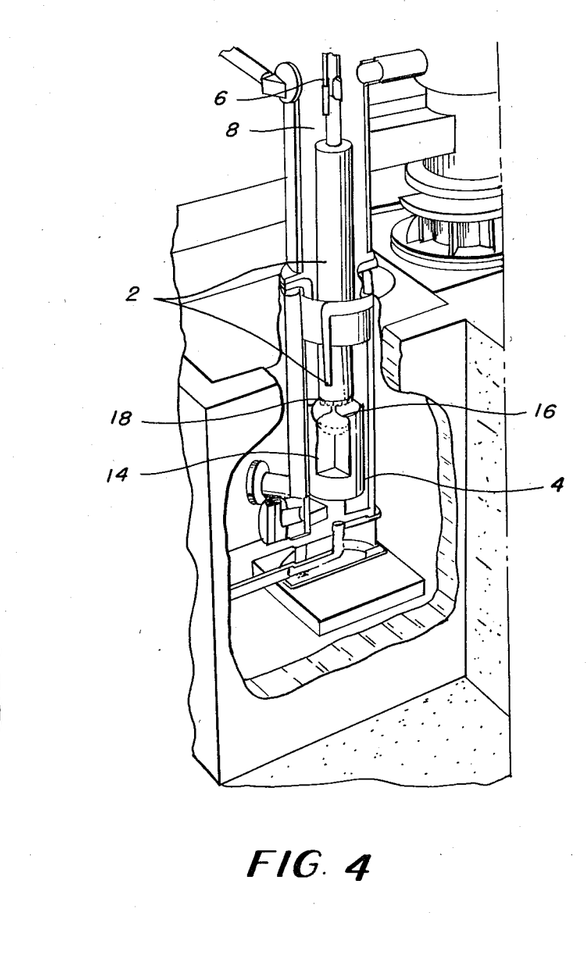
FIG. 4 is a partial cutaway of a portion of the vacuum consumable arc remelt furnace of FIG. 3.

Referring to FIGS. 3 and 4, a typical vacuum consumable arc remelt furnace is illustrated. A consumable electrode 2 is positioned within a water cooled crucible 4. In the preferred embodiment, the crucible is manufactured of copper in order to provide the desired thermal and electrical conductivity. The consumable electrode 2 is attached to a water cooled ram 6 which is the preferred embodiment is also manufactured of copper. The water cooled ram and consumable electrode pass into a vacuum chamber 8. The water cooled ram 6 interacts with the walls of the vacuum chamber 8 by slidably engaging with a sliding vacuum seal 10 which seals the vacuum chamber 8 and allows evacuation thereof. The position of the consumable electrode 2 is controlled by adjustment thereof via the water cooled ram 6 which is adjusted by a drive mechanism 12 which can be of any suitable type known in the art and which controls the position of the consumable electrode 2. For example, the drive mechanism 12 can be a known single servo motor gear reduction drive system, a fine/course dual motor differential gear drive mechanism or any other known electric motor driven electrode adjustment system. Alternatively, the drive mechanism 12 could be a solenoid valve controlled piston and cylinder hydraulic system of a variable volume pump type hydraulic motor drive system.

The drive mechanism 12 is used to adjust the consumable electrode 2 relative to a molten surface 16 of a remelt ingot 14. In operation, a relatively low voltage (on the order of 20 to 30 volts) high amperage (on the order of kiloamperes) current is passed through the water cooled ram 6 and consumable electrode 2 to produce an arc between the consumable electrode 2 and the molten surface 16 of the remelt ingot 14. As previously described, a slow melting of the consumable electrode 2 is achieved with the arc 18. This slow melting is generated within a vacuum environment produced by the vacuum chamber 8. A negative voltage is applied to the consumable electrode 2 while the remelt ingot 14 and thus its molten surface 16 is held at ground potential. The temperature of the ingot is controlled by the coolant flowing through the water cooled crucible 4. Thus, a relatively small molten surface pool 16 is maintained. As metal is melted off the consumable electrode 2, it is deposited on the ingot which grows upwardly. Simultaneously, the arc surface of the consumable electrode 2 is eroded by the melting of surface metal and thus the length of the consumable electrode 2 is of a diameter less than that of the crucible 4 in order to prevent arcing between the crucible wall and the consumable electrode, the consumable electrode 2 erodes at a rate equal to the rate of accumulation of metal on the remelt ingot 14. Since the electrode is smaller in diameter than the ingot, it must be driven down at a rate exceeding the ingot growth rate. Thus, the consumable electrode must be lowered by the drive mechanism 12 via the water cooled ram 6 in order to maintain a given distance between the electrode 2 and the molten surface 16 of the remelt ingot 14. This distance, the electrode gap, must be maintained constant for optimum process performance.

Figure 5:
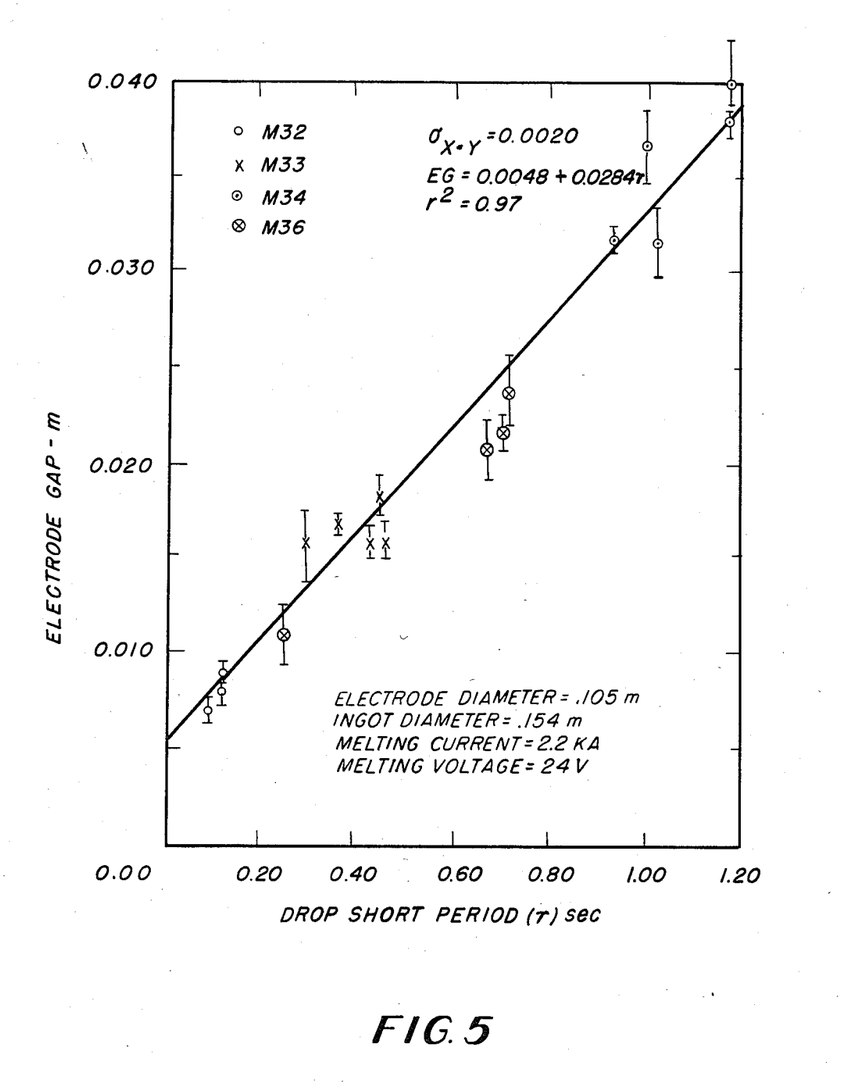
FIG. 5 illustrates the relationship between electrode gap and average drop short period.

Applicants have discovered that the average drop short peak period is closely correlated to electrode gap as shown in FIG. 5 of the present application. The data used to produce FIG. 5 was generated by counting the total number of drop shorts during a time in which the electrode gap was experimentally held constant when melting an A-286 type alloy under the conditions listed in FIG. 5. Four separate melts were utilized in order to produce the test data illustrated in FIG. 5. It was thus determined that a linear function of the general form:

$$Y = a + bX \qquad [1]$$

(where Y=dependent variable; X=independent variable; a=intercept on Y access; b=slope). This function is fit to the data of FIG. 5 by a least squares regression. This technique yielded the following relationship:

$$EG = 0.0048 + 0.0248\tau \qquad [2]$$

where EG is electrode gap in meters and $\tau$ is drop short period in seconds. The coefficient of determination for this fit was 0.97. The error bands on each of the data points of FIG. 5 represent the spread in electrode gap over the entire time interval. The standard error of estimate ($\sigma$x, y) for this model was 0.002 meter. Thus, from a review of the data of FIG. 5 it is clear that drop short period is closely correlated to electrode gap. This equation [2] is typical for the melting conditions and alloy listed. Other slopes b and intercepts a would have to be determined experimentally for other alloys and melting conditions.

Using statistics, it is possible to determine the minimum sample interval necessary to insure a valid period measurement provided that an average period for a long interval is known.

Figure 6:
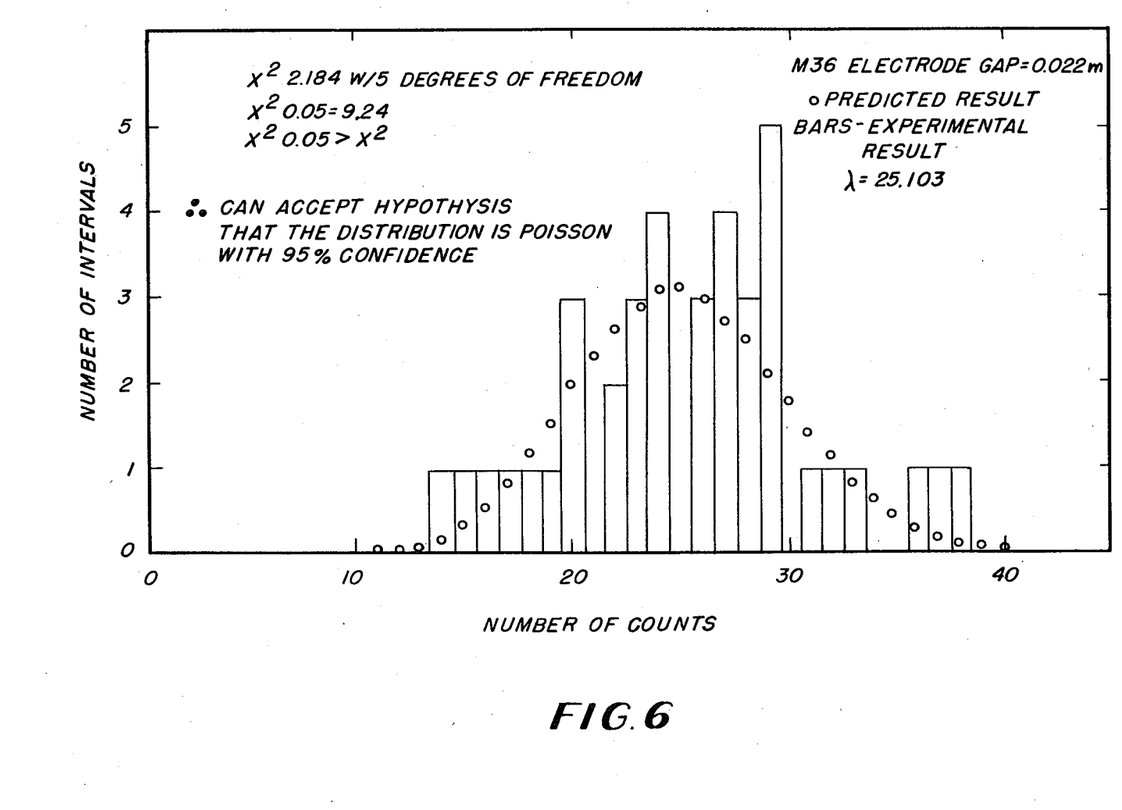
FIG. 6 shows the relationship between predicted results and experimental results illustrating that the probability of drop short occurrence follows a Poisson distribution.

As shown in FIG. 6, experimental data has demonstrated that the probability of drop short occurrence follows a Poisson distribution. Experimental data was correlated to predicted data and standard statistical methods were used to determine that the distribution was a Poisson distribution within 95% confidence.

Once it is accepted that the probability of drop short occurrence obeys a Poisson distribution, classical statistical analysis can be used to determine the time period necessary to obtain a valid period measurement. For example, it is desired to find a number of counts required to be 95% confident that the measured period is within 20% of a true mean. For the above criteria, the resolution is equal to $0.2\lambda$, where $\lambda$ is the mean number of counts, and the confidence interval half width is equal to $2\sqrt{\lambda}$, or two standard deviations. Setting the resolution equal to the confidence interval half width yields:

$$0.2\lambda = 2\sqrt{\lambda} \qquad [3]$$

Solving for this equation we find that $\lambda = 100$ counts and that therefore the detection of 100 drop shorts is necessary to obtain a valid period measurement within the above criteria for confidence and precision. If the average period in this case is 0.2 s (5 counts/s), a counting interval of 20 seconds is necessary.

Applicant's discovery that the average drop short period is closely correlated to measured electrode gap enables applicants to control the electrode gap based upon average measured period. To this end, the process according to the teachings of the present application is performed by the system illustrated in FIG. 7.

Figure 7:
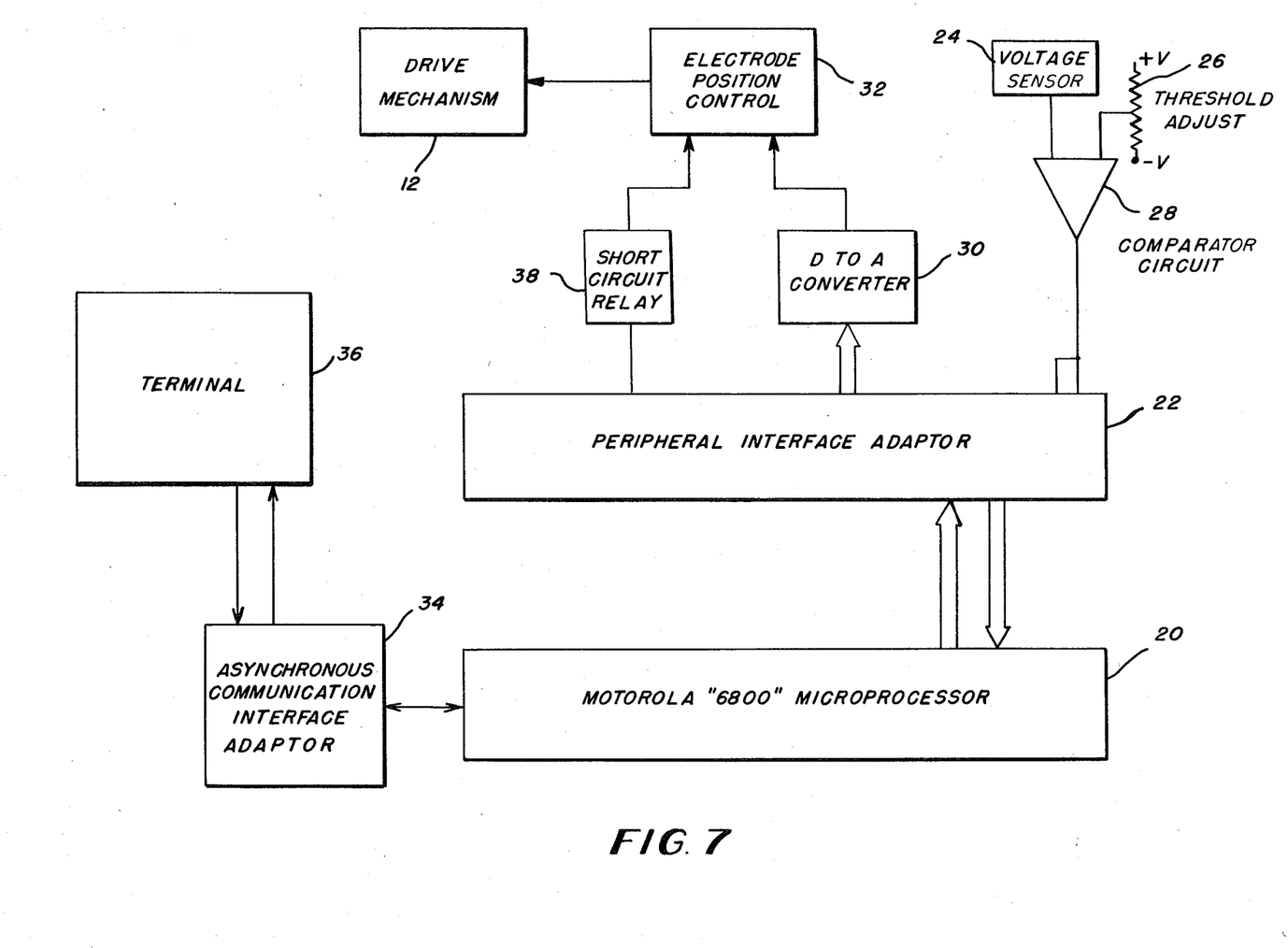
FIG. 7 is a system schematic of the control of the present invention.

Referring to FIG. 7, the control system of the present invention serves to monitor the consumable electrode, remelt ingot voltage and control the position of the consumable electrode therefrom. An analog voltage sensor 24 monitors the voltage across the consumable electrode and remelt ingot in a known manner by sensing the negative voltage at the ingot 14. A comparator circuit 28 then compares this sensed voltage to a threshold voltage to produce an output when the voltage drop as shown in FIG. 1 signifies that a drop short has occurred. Thus, the comparator circuit 28 produces a pulse equal to the duration of each drop short. These pulses are provided to a microprocessor 20 via a peripheral interface adapter 22 in a manner generally known in the art. The microprocessor 20 processes these drop short pulse signals generated by the comparator circuit 28 and produces a displacement difference signal, when necessary, indicative of the difference between the actual electrode position and a desired electrode position. This displacement difference signal is used to calculate an updated velocity signal. The microprocessor 20 then presents this digital updated velocity signal representative of the updated velocity to the peripheral interface adapter 22 where it is processed and presented to a digital to analog converter 30 which decodes the digital information to present an analog velocity signal to an electrode position control 32.

The electrode position control 32 may be any known type of control which can control any known type of drive mechanism 12 to update the velocity and correct the existing error. In the preferred embodiment, the magnitude of the signal presented to the electrode position control position 32 from the digital to analog converter 30 varies the velocity of the drive mechanism to vary the rate of advancement of the consumable electrode as a function of the magnitude of the updated velocity signal presented to the digital to analog converter 30 by the microprocessor 20.

The system of the present invention is further provided with an input terminal 36 which may be used by the operator to program necessary data into the microprocessor 20 via an asynchronous communication interface adapter 34 in any manner known to those skilled in the art. This information is then used by the microprocessor 20 to process the drop short pulses provided by the comparator circuit 28 to produce a digital updated velocity provided to the digital analog converter 30.

The system of the present invention further includes a short circuit relay 38 which is actuated any time a drop short has a duration greater than a predetermined time in order to control the electrode position control 32 to immediately and rapidly raise the consumable electrode via drive mechanism 12 when the voltage drops for too long a duration signifying a massive short circuit.

The above described system for controlling the position of the consumable electrode according to the teachings of the present invention performs the process of the present invention as follows.

The melt is started under manual conditions and after the arc is stabilized the system is switched to the automatic mode by engaging the circuitry of FIG. 7. Initially, the consumable electrode is driven by the electrode position control and drive mechanism at an initialized estimate of required consumable electrode velocity. The microprocessor 20 monitors the pulses received from the comparator circuit and accumulates the number of received pulses in a drop short occurrence register. Simultaneously, the microprocessor monitors and stores the time during which the drop short pulses are accumulated in an elapsed time register. The number of counts necessary for a valid drop short frequency measurement based upon the statistical criteria set forth above has been entered into the microprocessor's memory via the terminal 36. This number is periodically compared with the accumulated number of drop shorts stored in the drop short occurrence register and when a coincidence occurs, the elapsed time for the accumulation of the drop short count stored within the elapsed time register is divided by the count to produce a value representative of drop short period. As the slope intercept for the drop short model shown in FIG. 5 has been initially entered into the microprocessor 20 via terminal 36, the microprocessor then calculates the actual electrode gap from this model utilizing equation [2] as set forth above.

The operator of the process of the present invention has initialized this system by entering the desired electrode gap to optimize the process and the initial estimate of consumable electrode velocity into the microprocessor via terminal 36. The microprocessor compares the actual electrode gap with the desired electrode gap to produce a digitalized quantity representative of the gap difference. If the computed actual electrode gap is equal to the desired electrode gap no further action is taken. However, if a digital gap error signal is produced, the velocity at which the consumable electrode is driven is modified according to the following formula:

$$V_{update} = D/T + V_{old} \qquad [4]$$

where $V_{old}$ is the current electrode velocity, D is the digital gap error, and T is the elapsed time for the accumulation of the drop short count stored within the elapsed time register. The digital velocity signal is then updated. When a difference between the desired and actual electrode gaps does exist and thus a digital gap error signal is generated, the digital updated velocity signal is provided to the digital to analog converter 30 via the peripheral interface adapter 22. This velocity signal is then decoded to produce an analog velocity value which is used by the electrode position controller to control the drive mechanism at a rate of displacement related to the magnitude of the detected difference and thus the level of the analog signal produced by the digital to analog converter 30.

Each time the number of drop shorts necessary to produce a valid frequency determination based upon the above presented statistical criteria is reached, the contents of the drop short occurrence register as well as the elapsed time register are reset and the control monitoring begins anew. Depending upon the magnitude of the error between the actual electrode gap of the desired electrode gap, the rate of advance of the consumable electrode 2 is thereby increased or decreased. Thus, the rate of advance of the consumable electrode is controlled to maintain the electrode gap substantially constant.

The system of the present invention is initialized by programming an initial guess for downward ram velocity and thus velocity of the consumable electrode into the microprocessor 20 via the terminal 36. This initial guess is used by the microprocessor to initialize the the rate of advance of the drive mechanism 12 in a known manner.

The microprocessor 20 of the present invention further monitors the duration of each drop short pulse produced by the comparator circuit 28. If this duration exceeds the time required for a full short circuit which is entered by the operator via terminal 36 to initialize the system, the microprocessor provides a signal to the short circuit relay 38 via the peripheral interface adapter 22. The short circuit relay 38 actuates contacts which cause the electrode position control to rapidly and immediately control the drive mechanism to retract the consumable electrode a predetermined distance away from the remelt ingot 14 so as to prevent a full short circuit, thus creating solidification defects within the ingot. Thus, each drop short is monitored to insure that its duration does not exceed a predetermined maximum which signifies that an actual short circuit has occurred. If the short circuit relay 38 is engaged to withdraw the consumable electrode a predetermined distance, after the arc is reestablished the registers within the microprocessor are reset and the control process is resumed.

The above presented algorithm is embodied in a program utilized with the Motorola 6800 microprocessor as part of the preferred embodiment of the present invention.

It should be understood that the method and apparatus of the present invention for controlling the electrode gap in a vacuum consumable arc remelting process may be modified as it occurred to one of ordinary skill in the art without departing from the spirit and scope of the present invention.

We claim:

1. A process of controlling the position of a consumable electrode in a consumable electrode furnace having an arc struck between said consumable electrode and a molten pool of material, said process comprising:
   monitoring the voltage across said arc to produce a monitored voltage signal;
   detecting the occurrence of drop shorts by comparing said monitored voltage signal to a drop short detection threshold signal and producing a drop short signal;
   determining the average period between drop shorts from said drop short signal;
   determining the actual electrode gap by non-invasive means using said average period and a drop short period electrode gap model slope and intercept;
   comparing said actual electrode gap with a desired electrode gap value and controlling the position of said consumable electrode based upon said comparison.

2. The process of claim 1 wherein said step of comparing and controlling the position of said consumable electrode varies the velocity of said electrode based upon the difference between said actual and desired electrode gaps.

3. The process of claim 1 further comprising:
   determining the duration of each drop short;
   raising said consumable electrode a predetermined distance if a drop short duration exceeds a preset duration.

4. A process of controlling a consumable electrode in a consumable electrode furnace having an arc struck between said consumable electrode and a molten pool of material comprising:
   monitoring the voltage across said arc to produce a monitored voltage signal;
   detecting the occurrence of drop shorts by comparing said monitored voltage signal to a drop short detection threshold signal and producing a drop short signal;
   totaling the number of drop short signals to determine the number of drop shorts;
   detecting when the number of drop shorts is sufficient for a valid short frequency determination, the probability of occurrence of drop shorts being based upon Poisson distribution;
   determining the time period necessary to reach said number of drop shorts sufficient for a valid short frequency determination;
   calaculating the average period between drop shorts from said time period and said number of shorts sufficient for a valid frequency determination;
   determining the actual electrode gap by non-invasion means using said average period and a drop short period electrode gap model slope and intercept;
   comparing said actual electrode gap with a desired electrode gap value and controlling the position of said consumable electrode based upon said comparison.

5. The process of claim 4 wherein said step of comparing and controlling the position of said consumable electrode varies the velocity of said electrode based upon the difference between said actual and desired electrode gaps.

6. The process of claim 4 further comprising:
   determining the duration of each drop short;
   raising said consumable electrode a predetermined distance if a drop short duration exceeds a preset duration.

7. The process of claim 4 wherein said number of drop shorts sufficient for a valid short frequency determination is based upon statistical criteria.

8. The process of claim 7 wherein 100 drop shorts are a sufficient number for a valid short frequency determination.

* * * * *